United States Patent [19]

Rosas et al.

[11] 3,846,435

[45] Nov. 5, 1974

[54] PROCESS FOR THE PRODUCTION OF 2-METHYL-5-ETHYL PYRIDINE

[75] Inventors: Carlos B. Rosas, Rahway; Joseph A. Wantuck, Woodbridge; Arnold Kaufman, Scotch Plains, all of N.J.

[73] Assignee: Merck & Co., Inc., Rahway, N.J.

[22] Filed: July 21, 1972

[21] Appl. No.: 274,020

[52] U.S. Cl. ............................................ 260/290 P
[51] Int. Cl. ............................................ C07d 31/08
[58] Field of Search .................................. 260/290

[56] References Cited
UNITED STATES PATENTS

| | | | |
|---|---|---|---|
| 2,615,022 | 10/1952 | Mahan | 260/290 |
| 2,717,897 | 9/1955 | Dunn | 260/290 |
| 2,745,835 | 5/1956 | Becker | 260/290 |
| 2,769,007 | 10/1956 | Bamford | 260/290 |
| 2,844,583 | 7/1958 | Schmizer | 260/290 |
| 2,935,513 | 5/1960 | Takeba et al. | 260/290 |

OTHER PUBLICATIONS

Frank et al., J. Am. Chem. Soc., Vol. 71, p. 2629–2635, (1949).

*Primary Examiner*—Harry I. Moatz

[57] ABSTRACT

A highly selective process for preparing aldehyde collidine (2-methyl-5-ethylpyridine) by reacting acetaldehyde with ammonium salts at elevated temperatures and pressure is disclosed. The aldehyde collidine obtained is an important intermediate in the preparation of niacin which is used as a drug and for food enrichment.

4 Claims, No Drawings

PROCESS FOR THE PRODUCTION OF 2-METHYL-5-ETHYL PYRIDINE

The present invention relates to an improved process for the production of alkyl pyridines. More particularly, this invention relates to an improved process for preparing 2-methyl-5-ethylpyridine, also designated as aldehyde collidine.

It is well known that alkyl pyridines can be produced by reaction of ammonia with an organic carbonyl compound, for example an aldehyde or ketone. The condensation of acetaldehyde and aqueous ammonia to afford 2-methyl-5-ethylpyridine has been effected noncatalytically as well as in the presence of various catalysts. Catalysts which have been employed in this process include ammonium acetate, fluorine containing compounds, for example hydrogen fluoride, ammonium fluoride, ammonium bifluoride, boron trifluoride, and the like, organo sulfonic acid compounds, for example ethane sulfonic acid, sulfur-fluorine compounds, for example sulfur monofluoride, sulfur tetrafluoride, sulfuryl fluoride, and sulfur hexafluoride, and molybdic acid, tungstic acid and the salts thereof. However, the prior art methods are not suitable for commercial production because of low yields of 2-methyl-5-ethylpyridine and the formation of various by-products. The prior art processes afford reaction products which contain yields of 2-methyl-5-ethylpyridine from acetaldehyde of approximately 50–60 percent, about 10 percent yield of a mixture of 2- and 4-picolines, and about 25 percent of high boiling pyridine compounds. It is also known that increased yields of 2-methyl-5-ethylpyridine of about 80 percent can be obtained by reacting paraldehyde, which must first be prepared from acetaldehyde, with aqueous ammonia. In view of the state of the art at the present time a process which is capable of producing 2-methyl-5-ethylpyridine from low cost aldehyde in high yield is most desirable.

In accordance with the process of this invention, the instant invention may be described as residing in a method for preparing 2-methyl-5-ethylpyridine in high yield and selectivity which comprises reacting acetaldehyde with an ammonium salt at elevated temperature and pressure.

The preparation of 2-methyl-5-ethylpyridine is conveniently carried out by reacting acetaldehyde with an aqueous ammonium salt solution in a pressure reactor. The ammonium salts within the scope of the process of this invention are known compounds and include ammonium acetate, ammonium dibasic phosphate, ammonium fluoride, ammonium bifluoride, ammonium borate, ammonium sulfide, ammonium benzoate, and ammonium molybdate. The ammonium salt for the reaction is employed as an aqueous solution in concentrations ranging from 10 to 80 percent weight ammonium salt. The reaction is run in an excess of the ammonium salt reactant; usually from 0.5 to 3.0 moles of ammonium compound is employed per mole of acetaldehyde.

An advantage of the novel process of this invention is that the aqueous ammonium salt phase obtained after extracting the reaction mixture with an organic solvent can be recycled to the reactor after refortification with ammonia. The aqueous salt phase is composed of the amount of water originally present in the salt solution, the cation of the ammonium salt reactant, and one mole of water for each mole of acetaldehyde consumed in the reaction. The aqueous salt phase is thus concentrated by any process known in the art, for example evaporation, to remove the mole of water formed as a result of the condensation reaction. Refortification of the salt phase is then accomplished by reacting the aqueous solution with liquid ammonia at ambient temperatures to form the ammonium salt.

Addition of the acetaldehyde can be carried out by pumping the reagent either semibatch or continuously into a standard pressure reactor. The rate of addition will depend on the residence time selected.

The reaction temperatures for the synthesis of 2-methyl-5-ethylpyridine are within the range from 180°C. to 270°C. and preferably from 200°C. to 250°C. In the semibatch mode the acetaldehyde can be added to the aqueous ammonium salt solution at a temperature of from 180°C. to 270°C. and after addition of the acetaldehyde is completed, the temperature of the reaction mixture maintained between 180°C. to 270°C. to allow the reaction to proceed to completion. At the end of the desired reaction period, the temperature is lowered to about room temperature and the 2-methyl-5-ethylpyridine is recovered from the reaction mixture by means well known in the art. One method comprises extracting the organic material from the aqueous reaction mixture with an organic solvent, for example benzene, xylene, toluene, chloroform, ether, and the like. The organic solvent is then removed in vacuo and 2-methyl-5-ethylpyridine is obtained by fractional distillation. Any other methods which can be employed for separation and recovery of the product are considered within the scope of the invention.

In carrying out the process of this invention, sufficient pressure should be used to maintain the reaction mixture in the liquid phase. When operating with a closed pressure reactor, the autogenous pressures developed by the addition of the acetaldehyde to the aqueous ammonium salt solution at the reaction temperature are satisfactory. These pressures are usually within the range of from 190 to 675 pounds per square inch gauge.

Although the invention has been described as a batch process, the process can also be practiced as a continuous operation and such operation is within the scope of this invention. In one embodiment of a continuous process, the reactants are introduced continously to a suitable pressure reactor from which a portion of the reaction mixture is withdrawn continuously. Reaction products are separated therefrom and unchanged reactants are then refortified and recycled to the reactor.

The continuous process can be carried out in any reactor which allows intimate mixing of reagents under vigorous stirring conditions, for example a continuous stirred tank reactor.

The following examples are given for purposes of illustration and should not be considered limitations of this invention; many apparent variations are possible without departing from the spirit or scope thereof.

EXAMPLE 1

Six hundred milliliters of a 10 molar aqueous ammonium acetate solution are charged into a 1 liter autoclave and heated to 225°C. while mixing at 1000 rpm. At 225°C. acetaldehyde is pumped continuously into the reactor at a rate which delivers 123 cc. in 90 minutes. During the addition of the acetaldehyde, the pressure gradually rises from 335 psig to 390 psig. After the addition of the acetaldehyde is completed, the reaction mass is allowed to stir for one hour at 225°C., and then cooled to 25°C. The reaction mixture is extracted with benzene (4 times 1/10 volume). The benzene extracts are combined and distilled in vacuo to afford 2-methyl-5-ethylpyridine in 76.9 percent yield, p.b. 177°C.

When in the above procedure ammonium fluoride, ammonium bifluoride, and ammonium sulfide are used in place of ammonium acetate, 2-methyl-5-ethylpyridine is obtained in comparable yields.

EXAMPLE 2

525 milliliters of a 3.9 molar aqueous solution of ammonium phosphate dibasic (pH 8.2) is charged to a one liter autoclave and heated to 215°C. while being mixed at 1500 rpm. At 215°C. a 9.0 molar aqueous solution of acetaldehyde is pumped continuously into the reactor at a rate which delivers 355 cc. in 114 minutes. During the acetaldehyde addition the pressure varies between 350 and 390 psig. At the end of the addition of acetaldehyde the reaction mass is cooled to 25°C. and is then extracted with benzene (3 × 100 cc). The benzene extracts are combined and assayed by vapor phase chromatography for 2-methyl-5-ethylpyridine (79.0 percent), $\alpha$-picoline (1.7 percent), $\gamma$-picoline (1.0 percent) and paraldehyde (0.6 percent). The product is recovered by atmospheric fractional distillation.

EXAMPLE 3

A volume of 9700 milliliters of a 3.35 molar aqueous ammonium phosphate dibasic solution (pH 8.15) is charged to a 5 gallon autoclave and heated to 225°C. while mixing at 780 rpm. At 225°C. acetaldehyde is pumped continuously into the reactor at a rate which delivers 2271 gm. in 50 minutes. The reaction pressure during the addition is 400 psig to 450 psig. After the addition of the acetaldehyde is completed the reaction mass is allowed to stir for 15 minutes at 225°C. and then cooled to 25°C. The reaction mixture is extracted with benzene (5 times 1000 cc). The benzene extracts are combined and the 2-methyl-5-ethylpyridine is isolated by atmospheric fractional distillation in 80.8 percent yield (99.8 percent pure). The spent aqueous phase is concentrated to remove the water generated by the reaction. It is refortified with ammonia to the dibasic salt stage (pH 8.2) and used in the next reaction cycle.

EXAMPLE 4

Six hundred milliliters of a 3.9 molar aqueous solution of ammonium phosphate dibasic is charged to a one liter autoclave and heated to 215°C. while mixing at 1500 rpm. At 215°acetaldehyde is pumped at 1.7 cc. per minute subsurface until a quantity equal to a molar ratio of acetaldehyde to ammonium salt of 1.2 has been delivered. At this point a 3.9 molar aqueous solution of ammonium phosphate dibasic (pH 8.2) is started to feed continuously subsurface at a rate of 6.5 cc. per minute. The two reactants (acetaldehyde and ammonium phosphate dibasic) are fed at the above rates while the product stream (two phase) is removed continuously from the reactor at 8.2 cc. per minute. The pressure of the reaction is 350 psig.

The product stream is continuously extracted with benzene at a volumetric ratio of 10 percent. It is then fractionated atmospherically to recover the product, 2-methyl-5-ethylpyridine in 85.0 percent yield. The other picolines, 2-picoline and 4-picoline, represent 1.7 and 0.7 percent conversion, respectively.

The spent aqueous salt stream is concentrated to remove the water generated by the reaction. It is then refortified to ammonium phosphate dibasic (pH 8.2) with ammonia and recycled to the reactor.

EXAMPLE 5

600 milliliters of a 10 molar aqueous ammonium acetate solution is charged into a 1 liter autoclave and heated to 225°C. while mixing at 1000 rpm. Paraldehyde is pumped continuously into the reactor at a rate of 1.1 cc./min. until 103 cc. has been added. The pressure increases during the addition of the paraldehyde from 335 psig to 390 psig. The reaction is heated for 1 hour at 225°C. after the addition of the paraldehyde is completed and then cooled to 25°C. The reaction mixture is washed with water and then extracted with benzene (4 times with 1/10 vol.). The benzene extracts are combined and distilled in vacuo to afford 76.9 percent of 2-methyl-5-ethylpyridine, b.p. 177°C. at atmospheric pressure.

When in the above procedure ammonium dibasic phosphate, ammonium fluoride, ammonium bifluoride, and ammonium sulfide are used in place of ammonium acetate, 2-methyl-5-ethylpyridine is obtained in comparable yields.

Various changes and modifications in the procedures herein disclosed will occur to those skilled in the art, and to the extent that such changes and modifications are embraced by the appended claims, it is to be understood that they constitute part of our invention.

What is claimed is:

1. A process for preparing 2-methyl-5-ethyl pyridine which comprises reacting 1 mole of acetaldehyde with an aqueous solution of from 0.5 to 3.0 moles of ammonium acetate, ammonium dibasic phosphate, ammonium fluoride, ammonium bifluoride, ammonium benzoate, ammonium borate, or ammonium sulfide at a temperature in the range of 180° to 270°C. and at a pressure sufficient to maintain the reaction mixture in the liquid phase.

2. The process of claim 1 wherein the pressure is in the range of 190 to 670 psig.

3. The process of claim 1 wherein the ammonium salt is ammonium dibasic phosphate.

4. A process for continuously preparing 2-methyl-5-ethyl pyridine which comprises continuously passing a mixture of 1 mole of acetaldehyde and an aqueous solution of from 0.5 to 3.0 moles of ammonium acetate, ammonium dibasic phosphate, ammonium fluoride, ammonium bifluoride, ammonium benzoate, ammonium borate, or ammonium sulfide to a pressure reactor at a temperature in the range of 180° to 270°C. and at a pressure sufficient to maintain the reaction mixture in the liquid phase.

* * * * *